United States Patent
Nannen et al.

(10) Patent No.: US 12,081,146 B2
(45) Date of Patent: Sep. 3, 2024

(54) METHOD FOR STARTING AND STOPPING AN ASYNCHRONOUS MOTOR

(71) Applicant: Siemens Aktiengesellschaft, Munich (DE)

(72) Inventors: Hauke Nannen, Nuremberg (DE); Heiko Zatocil, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/927,438

(22) PCT Filed: Apr. 23, 2021

(86) PCT No.: PCT/EP2021/060625
§ 371 (c)(1),
(2) Date: Nov. 23, 2022

(87) PCT Pub. No.: WO2021/239344
PCT Pub. Date: Dec. 2, 2021

(65) Prior Publication Data
US 2023/0179125 A1  Jun. 8, 2023

(30) Foreign Application Priority Data
May 25, 2020  (EP) .................................... 20176295

(51) Int. Cl.
*H02P 1/26* (2006.01)
(52) U.S. Cl.
CPC ............ *H02P 1/26* (2013.01); *H02P 2207/01* (2013.01)

(58) Field of Classification Search
CPC ....................................................... H02P 1/26
See application file for complete search history.

(56) References Cited

U.S. PATENT DOCUMENTS

| 8,674,650 B1* | 3/2014 | Rabinovich | H02P 3/18 |
| | | | 318/434 |
| 2015/0048690 A1* | 2/2015 | Waltuch | H05K 7/20154 |
| | | | 307/112 |

(Continued)

OTHER PUBLICATIONS

Leuer, Michael et al.; "Model predictive control strategy for multi-phase thyristor matrix converters—Advantages, problems and solutions", 2016 18th European Conference o Power Electronics and Applications (EPE'16 ECCE Europe), Jointly Owned by IEEE-PELS and EPE Association, Sep. 5, 2016 (Sep. 5, 2016), pp. 1-10, XP032985067, DOI: 10.1109/EPE.2016.7695350, [found on Oct. 25, 2016].

(Continued)

*Primary Examiner* — Zoheb S Imtiaz
(74) *Attorney, Agent, or Firm* — Laurence A. Greenberg; Werner H. Stemer; Ralph E. Locher

(57) ABSTRACT

A method for starting and stopping an asynchronous motor by way of a soft starter. The method includes the following steps: determining ignition options of one or more thyristors of the soft starter that are possible at a future calculation time; predicting the motor behavior for the determined ignition options, if an ignition of one or more thyristors of the soft starter is carried out; based on the predicted motor behavior, deciding whether an ignition option is to be selected and which is to be selected; and generating one or more ignition signals for one or more thyristors, if the decision for an ignition option has been made.

11 Claims, 8 Drawing Sheets

(56) References Cited

U.S. PATENT DOCUMENTS

| | | | |
|---|---|---|---|
| 2015/0333685 A1* | 11/2015 | Wei | H02P 21/28 |
| | | | 318/430 |
| 2017/0237373 A1* | 8/2017 | Tabuchi | H02P 9/08 |
| | | | 322/79 |
| 2018/0062545 A1* | 3/2018 | Penkov | H02P 3/18 |
| 2019/0089146 A1* | 3/2019 | Li | H02H 7/0858 |

OTHER PUBLICATIONS

Siemens manual Sirius 3RW50 soft starter, Siemens AG, Amberg, Sep. 2019, A5E35628455001A/RS-AA/001, Chapter A.1; 2019.

Arshad, M. H. et al.; "Weighting Factors Optimization of Model Predictive Torque Control of Induction Motor Using NSGA-II With TOPSIS Decision Making", IEEE Access, Bd. 7 , pp. 177595-177606, XP011762501, DOI: 10.1109/ACCESS.2019.2958415, [found on Dec. 17, 2019].

Choi, Woo Jin et al.; "A novel MPC-SVM strategy for direct torque flux control of an induction motor drive system using a matrix converter", 2014 IEEE International Conference on Industrial Technology (ICIT), IEEE, Feb. 26, 2014 (Feb. 26, 2014), pp. 181-186, XP032639917, DOI: 10.1109/ICIT.2014.6894935, [found on Sep. 9, 2014].

Benecke, Marcel; "Anlauf von energieeffizienten Synchronmaschinen mit Drehstromsteller",, Sep. 6, 2012 (Sep. 6, 2012), XP055392434, Gefunden im Internet: URL:http://d-nb.info/1054135258/34, [found on Jul. 20, 2017].

* cited by examiner

METHOD FOR STARTING AND STOPPING AN ASYNCHRONOUS MOTOR

FIELD AND BACKGROUND OF THE INVENTION

The invention relates to a method for starting and stopping an asynchronous motor. The invention also relates to a soft starter. Equally, the invention relates to a computer program product that can be used to perform the method.

Soft starters refer to devices that have a power-electronics control action by means of thyristors. When using conventional control methods, these thyristors may be used to lower the grid voltage in order to achieve improved starting for asynchronous motors, ASMs for short, also called induction motors. Soft starters are used in various applications, among other things for pumps and fans in industrial applications. They are useful whenever the start-up currents of asynchronous motors, which are approximately 6 to 10 times the rated current, are supposed to be reduced or the starting torque of a starting asynchronous motor, at least part of which torque is usually much greater than the rated torque, is supposed to be lowered. Soft starters usually intervene until the applicable motor has reached its rated speed and therefore the starting process is at an end. In industrial devices, as soon as the starting process is at an end, so-called bypass contacts are often switched in, which take over carrying the current and connect the ASM directly to the grid. Current conduction via the bypass contacts has the great advantage that no further losses occur in the thyristors.

FIG. 1 shows a typical soft starter topology with a soft starter 1 for starting an asynchronous motor 4, which soft starter is connected between a three-phase electrical grid 5 and the ASM 4, having one antiparallel-connected pair of thyristors 2 and one bypass contact 3 per phase a, b, c. The current $i_a$, $i_b$, $i_c$ is measured on the motor side in all the phases a, b, c. Additionally, the soft starter 1 uses grid-side line-to-line measurements $u_{A,B}$, $u_{B,C}$, $u_{C,A}$, in order to calculate the grid voltages $u_A$, $u_B$, $u_C$, and motor-side line-to-line measurements $u_{a,b}$, $u_{b,c}$, $u_{c,a}$, in order to calculate the motor voltages $u_a$, $u_b$, $u_c$. Similar topologies, albeit in which only two of three grid phases are switchable in the soft starter, can be found e.g. in the Siemens equipment handbook Sanftstarter SIRIUS 3RW50, Siemens A G, Amberg, September/2019, A5E35628455001A/RS-AA/001, Chapter A.1.

Although the scope of functions of soft starters has been broadened to an ever greater extent in recent decades, e.g. by way of voltage ramp, current-limited operation, torque-controlled start-up and speed-controlled start-up, the essential features of the structure for generating control pulses have remained the same and it has the structure shown in FIG. 2, essentially comprising three blocks, which are explained below:

In a first block of the soft starter, the controller 21, the manipulated value of the firing angle α, also known as the control angle, is generated by a controller structure from measured values 24 such as the stator current $I_{1,RMS}$, the stator voltage $U_{1,RMS}$ and/or the rotor speed n of the motor. The firing angle & may be influenced, by factoring in various parameters 25, such as e.g. the motor torque, the maximum setpoint current or a speed ramp, in such a way that the behavior becomes optimal for the application. The firing angle α defines the RMS value of the voltages applied to the individual phases a, b, c of the motor (RMS=root mean square). A simple way of generating a firing angle α is a voltage ramp, independently of the load reaction; for this purpose, the firing angle α is simply increased as a function of time. It is necessary to begin here with a sufficiently great initial value of the firing angle α in order that the initial motor torque $M_M$ is already greater than the load torque $M_L$; otherwise, the motor current would not accelerate the rotor and would only produce high losses while it is idle, until the motor torque is high enough to accelerate the rotor.

A second block 22 of the soft starter is used for generating initiation signals 27 for initiating thyristor firings, the initiation signals 27 being generated on the basis of the measured grid voltage 26.

FIG. 3 shows the relationship between the voltage u across the thyristor, the current i flowing through the thyristor and the firing angle α as a function of time t. The conventional soft starter algorithm uses the principle of voltage reduction to start ASMs. A lowering of the grid voltage is achieved from a firing angle α by continuously firing the thyristors using the same firing angle. This reduction in the grid voltage leads to an approximate proportional reduction in the starting current:

$$I_{1,RMS} \sim U_{1,RMS} \tag{1}$$

The stator current $I_{1,RMS}$ of the motor, motor current for short, decreases in proportion to the applied motor voltage $U_{1,RMS}$. Since the motor torque $M_M$ is approximately quadratically dependent on the motor current $I_{1,RMS}$, there is a significant reduction for the motor torque $M_M$ too, even in the case of smaller dips in the motor voltage $U_{1,RMS}$:

$$M_M \sim I_{1,RMS}^2 \sim U_{1,RMS}^2 \tag{2}$$

A third block 23 of the soft starter comprises the thyristors and firing devices, e.g. a firing signal unit; it uses the firing signals received from the second block 22 for generating the output voltage.

A conventional soft starter algorithm uses steady-state values for controlling, e.g., the motor current $I_{1,RMS}$. All considerations are based on the assumption that the system is more or less in a steady state and the slippage changes over time.

One problem when starting up an asynchronous motor using the soft starter is losses. Firstly, losses occur inside the device as a result of the thyristors. This requires good cooling, in particular of the thyristors in the device. Secondly, increased losses occur in the motor during start-up. These are much greater than the customary motor losses during rated operation. These two factors lead to the number of starts that may be carried out in succession being limited.

SUMMARY OF THE INVENTION

The invention is therefore based on the object of reducing the losses that occur when starting up an asynchronous motor connected to a soft starter.

The object is achieved by way of a method as claimed. The object is also achieved by way of a soft starter as claimed. The object is also achieved by way of a computer program product as claimed.

The method according to the invention is used for starting and stopping an asynchronous motor by means of a soft starter. The soft starter is connected in the electrical supply line between an electrical grid for supplying an ASM with electrical energy and the ASM, the soft starter comprising thyristors connected in antiparallel in the switchable phases, preferably in two or three phases of the supply line, as a result of which the soft starter is able to operate as a power controller. Starting an asynchronous motor is also referred to as start-up; this denotes the phase between the motor being idle and the time at which the motor reaches its rated speed. Stopping an asynchronous motor is the opposite process to starting: this denotes the phase between a time at which the motor rotates at its rated speed for the last time and the motor being idle. In both phases, an acceleration of the motor takes place: a positive acceleration (increase in the rotation speed) when starting and a negative acceleration (decrease in the rotation speed) when stopping. The method according to the invention is suitable for both processes, starting and stopping.

The method has a first step, in which opportunities to fire one or more thyristors of the soft starter are ascertained for a calculation time in the future. The calculation time in the future may also be a period or time period in which one or more thyristors of the soft starter may be fired. Opportunities to fire one or more thyristors of the soft starter are also referred to as firing opportunities or firing options. The thyristors used in the soft starter have the property that although they may be switched on, i.e. fired, they cannot be switched off again. They do not go into the off state again until the current is at a zero crossing. This leads to a performed firing usually defining the current over a period of several milliseconds. The number of firing opportunities may therefore be restricted on account of e.g. two phases at the calculation time still conducting a current that still flows in the system due to a firing at an earlier time. In the case of a 3-phase grid topology, the number of firing opportunities then reduces to one, since only the third phase is able to be "fired in addition".

The method has a further step, in which the electrical and/or mechanical motor behavior if a firing of one or more thyristors of the soft starter were performed is forecast for the ascertained firing opportunities. A motor model is used to forecast the resultant behavior for the firing opportunities derived from the topology. To this end, the connected ASM may be modelled by means of a transient motor model.

The method has a further step, in which the forecast electrical and/or mechanical motor behavior is taken as a basis for deciding whether and which firing opportunity is supposed to be chosen. It is possible for the forecast motor behavior and decision criteria to be taken into consideration in the method in order to decide that none of the ascertained firing opportunities are supposed to be chosen. In that case, no firing is performed at the calculation time for which no firing opportunities have been chosen. Instead, the firing opportunities may be ascertained for a later calculation time, preferably for an immediately following calculation time, i.e. there may be a subsequent fresh pass of the method, beginning at the first step.

Furthermore, the method has a further step, in which one or more firing signals for the soft starter are generated if the decision has been made to take a firing opportunity. This step may be followed by a fresh pass of the method, beginning at the first step.

As explained in the introduction, the control, in particular the pulse generation, in soft starters has changed little in recent decades. This is the starting point for the invention: instead of using the existing structure to generate firing signals, a new structure is used that does not operate by means of firing angles and is also not reliant on continuous actuation of the thyristors.

The new method relies on a model-predictive approach for generating firing signals for soft starters: first, all the firing cases, the so-called firing opportunities, that are possible in the next time step are calculated and then a decision is made as to whether or not the firing opportunities are able to be used. That is to say that instead of relying on a continuous firing of the thyristors, on mean values and on the assumption of steady states, like the conventional methods, the invention involves using a model to make a forecast, i.e. a prediction, of the transient electrical and/or mechanical motor behavior and using said forecast to make a decision about the firing. The considerations of the new method are situational and are not based on average values or a steady-state behavior. Next, directly or in a fixed timeframe, the method is repeated. This prediction is preferably performed just for the firing opportunities that are immediately imminent.

The basic concept is thus that of using a motor model to forecast the electrical and/or mechanical motor behavior for all firing opportunities for at least one next time step. To this end, initialization is accomplished by measuring and calculating all the state variables of the system. Grid voltages $U_A$, $U_B$, $U_C$ are measured in order to calculate the grid angle $\varphi_{grid}$ and the grid voltage amplitude $U_{grid}$. The motor currents $i_a$, $i_b$, $i_c$ and motor voltages $u_a$, $u_b$, $u_c$ are also used for a model-based calculation of the linked magnetic flux $\vec{\Psi}_2^K$ of the rotor, subsequently also referred to as rotor magnetic flux linkage or simply as rotor flux. Together with the measured mechanical rotor speed n and the grid frequency $f_{grid}$, all system variables are defined.

This information is used to calculate all the firing combinations possible in the next time step with the motor model, i.e. the so-called firing opportunities. In the case of a 3-phase grid topology, the result is up to four calculated torque and current variants over time:

1st-3rd two conductive phases (a and b, or b and c, or c and a)

4th three conductive phases (a, b and c).

The calculated results may be checked for exceedance of limit values using various criteria. If there is a usable firing opportunity, the algorithm generates firing signals in order to convert the calculated result into reality.

The invention has the advantage that the losses in the soft starter and in the induction motor during the starting process are reduced. This allows more starts to be performed per unit time, cooling to be reduced and therefore smaller soft starters to be built and, if an application is started often, energy to be saved.

There are two fundamental steps of the new method: prediction and decision.

The basis of the method is prediction, i.e. a forecast. The thyristors used in the soft starter have the property that although they may be switched on, i.e. fired, they cannot be switched off again. They do not go into the off state again until the current is at a zero crossing. This leads to a performed firing usually defining the current over a period of several milliseconds. In the case of a 50 Hz AC voltage, a zero crossing in the voltage takes place every 10 ms. Another influencing variable is the combination of motor phases to be fired. In principle, a distinction may be drawn between two-phase and three-phase firings here. In the case of the soft starter topology shown in FIG. 1, four firing opportunities therefore arise:

1. firing of phases a and b,
2. firing of phases b and c,
3. firing of phases c and a,
4. firing of phases a, b and c.

The approach described here is not limited to the topology shown in FIG. 1. This merely provides a good basis for explanation. Other topologies, including for 2-phase soft starters, may fundamentally likewise be operated using the methodology described here, even if, in detail, influences on performance can be expected. Other interconnections of power-electronics switches would also be possible, e.g. root 3 circuit, thyristor reversing circuit. Ultimately, it is necessary here to consider only which thyristors may be fired together, that is to say which firing cases arise. These may subsequently be predicted and rated using the described method. The methodology remains identical.

The number of firing opportunities may be restricted on account of e.g. two phases at the calculation time still conducting a current that still flows in the system due to a firing at an earlier time. In the case of the topology shown here, the number of firing opportunities then reduces to one, since only the third phase is able to be "fired in addition".

A model is used to forecast the resultant behavior for the firing opportunities derived from the topology. To this end, the connected motor may be modelled by means of a transient motor model.

The equation systems presented above may be used to forecast the electrical and/or mechanical motor behavior, but the states of the model need to be initialized before the remainder of the response is able to be calculated. That is to say that the simulation model needs to be put into the present state from which the forecast starts. This requires the following variables to be determined:

The stator current may easily be measured in the soft starter. The model is thus initialized using the present current value.

The rotor flux, in contrast to the stator current, cannot easily be measured. The actual flux in the rotor is almost never measured in industrial practice due to the high levels of effort. The most common solution is to use a flux observer or flux model. The measured motor currents and/or motor voltages may be used to reconstruct the flux in the motor. A multiplicity of methods are known for this purpose.

Besides the rotor flux, the motor speed has a decisive influence. This may be measured by means of a tachogenerator. It is also possible to ascertain the speed from other measured variables, such as e.g. current and voltage. One possible implementation is the use of a flux observer/model.

The present grid angle and the amplitude of the grid voltage are measured. These are used as a starting value. Next, the grid frequency is used to calculate how the grid voltage develops further over the time steps of the prediction.

All variables are then known and the model can be initialized. Next, the state variables of the respective firing opportunities are calculated until a current zero crossing occurs.

After the prediction, it is clear which opportunities for firing there are in the present situation, i.e. which firing opportunities. These may then be checked for a multiplicity of criteria and rated. The following decision criteria and applicable combinations thereof are conceivable:
1. maximum stator current,
2. maximum torque peak/maximum torque amplitude,
3. minimum on-time for thyristors (to guarantee defined firings and prevention of misfirings),
4. minimum average torque,
5. maximum rotor flux,
6. minimum rotor flux growth as a result of the firing,
7. thyristor losses,
8. motor losses.

This list of possible decision criteria is not exhaustive. Other criteria may be used for decision-making, or specific possible decision criteria among those listed above may be ignored or weighted differently depending on the application being considered.

These decision criteria may be checked either after the prediction or during the prediction, in particular given simple thresholds such as maximum current or maximum torque. In the end, all the possible firing cases are rated and a decision is made as to whether or not one of the firings is useful. If none of the opportunities seems appropriate for the desired aim, i.e. accelerating the motor, no action takes place and the next iteration is awaited.

In principle, the decision criterion may be used to directly influence the behavior of the system. Operating modes that are not possible with today's standard methods are also conceivable. By cleverly influencing the maximum torque, it would be possible to set up a type of control that allows ramped acceleration.

The whole method comprising prediction and decision may be tracked in a fixed or variable timeframe and therefore the motor may be accelerated further.

Advantageous configurations and developments of the invention are specified in the dependent claims.

According to one preferred configuration of the invention, firing opportunities are ascertained for the next particular time step. The calculation times may lie in a fixed timeframe; the calculation times then follow one another in defined, preferably even, time steps.

According to one preferred configuration of the invention, the electrical and/or mechanical motor behavior is modelled by means of a transient motor model.

According to one preferred configuration of the invention, the decision as to whether a calculated firing option is supposed to be chosen is made on the basis of one or more of the following decision criteria: maximum stator current, maximum torque, minimum on-time for thyristors, minimum average torque, maximum rotor flux, minimum rotor flux growth as a result of the firing, thyristor losses, motor losses.

According to one preferred configuration of the invention firing does not take place at the immediate next calculation time and the forecast for a calculation time that follows the immediate next calculation time is awaited if it has been decided that a firing opportunity is not useful.

According to one preferred configuration of the invention, only firing opportunities that result in negative torques and therefore actively slow down the asynchronous motor are ascertained.

According to one preferred configuration of the invention, a present rotor angle, a present rotor speed, a present grid phase angle and the present stator phase currents are ascertained repeatedly, the present rotor angle, the present rotor speed, the present grid phase angle and the present stator phase currents are used to anticipate a torque response for a torque acting on the rotor for first firing opportunities, in which firing of thyristors turns on two phases, and for a second firing opportunity, in which firing of thyristors turns on three phases, and the anticipated torque responses are used to decide whether each thyristor pair is fired.

According to one preferred configuration of the invention, one or more iterations are omitted. The advantage of this is that the calculating processor is relieved of load if it is currently busy with other activities, e.g. communication.

According to one preferred configuration of the invention, one or more iterations are added, i.e. the iteration density is increased, e.g. when processor load is lower or there are few firing opportunities. The advantage of this is that the capacity of the processor is fully utilized in order to optimize start-up.

According to one preferred configuration of the invention, the step of forecasting the electrical and/or mechanical motor behavior is preceded by a step of magnetic flux generation in the rotor by way of firings of the thyristors. In a permanent-magnet motor, it is essentially the case that the rotor magnetic flux, also simply referred to as rotor flux, which is imperative for producing the torque for the motor, is generated by permanent magnets. This rotor flux is of fixed amplitude and also has a fixed mechanical position on the motor. In the case of the asynchronous motor, on the other hand, there is initially no flux in the motor when the motor is idle. Initially, the rotor is merely a construction comprising magnetic sheet steel, aluminum and optionally copper. That is to say that magnetic flux, also simply referred to as flux, first needs to be taken into the machine, as it has a decisive influence on the torque that can be produced by the asynchronous motor: to this end, one or preferably more current pulses specifically take flux into the motor in order to subsequently be able to accelerate the motor. In the case of the asynchronous motor, it is thus necessary to introduce the flux in the motor oneself initially. At the same time, the decision regarding whether a firing is useful is no longer shaped just by the question of whether torque or current limits are exceeded, but rather also by how the flux in the motor is influenced by the firing. That is to say that if a firing produces a particularly high torque, but ensures that the flux in the motor falls, then although a success has been achieved in the short term, this is at the cost that only a reduced or relatively small torque is subsequently able to be achieved in the next firing, since the rotor flux is relatively small. The decision thus needs to take account of whether the firing that would be chosen on the basis of current and torque responses is actually useful in regard to the magnetization of the motor. This may be taken into consideration in the decision criterion, e.g. by way of limits for "maximum rotor flux", "minimum rotor flux" or "minimum growth of the rotor flux during a firing".

It is possible for a magnetized rotor, that is to say a magnetic flux in the rotor of the motor, to be generated by way of two-phase firings at always the same grid phase angle, i.e. for always the same grid angle. These two-phase firings result in a pulsating current space vector that characterizes a magnetic flux in a firmly defined direction in the rotor. Such a time period of rotor flux generation precedes the actual starting process in order to be able to start with a magnetized motor.

Another difference between a permanent-magnet motor and an asynchronous motor is that with the asynchronous motor, in contrast to the permanent-magnet motor, it is necessary to factor in no longer just the position but also the variable amplitude of the magnetic flux. This is needed because the amplitude is also dependent on the previous energization. A method is thus also required that determines not only the flux angle but also the whole flux vector. To determine the flux vector, a large number of methods for estimating the rotor flux in an asynchronous motor have become established in the prior art.

The fact that it is also necessary to include the obtainment of flux in the assessment of the decision criterion may advantageously be used as an additional degree of freedom. As such, for example it is possible to rotate the flux from its present position referenced to the rotor into a different position if the externally applied current causes this. This means that the rotor flux is no longer fixed at or in the rotor position but rather may also be rotated along to some extent; this is incidentally the reason why the motor always runs on the grid at just under the synchronous speed, that is to say asynchronously.

Additionally, it is possible to increase or decrease the rotor flux by way of deliberate firings; this allows start-up to be optimized. If e.g. the flux is kept high by deliberately influencing the decision criterion, it is possible to achieve very high starting torques, in particular in the lower speed range. On the other hand, it is possible to keep the flux at a relatively low value in order to keep the corresponding rotor losses as low as possible. This may be advantageous e.g. for applications such as fans. Here, there are relatively low torque requirements (quadratic load characteristic) in the lower speed range; a high flux to produce high torques would not be at all necessary here. Since fewer losses arise as a result of the deliberate reduction of the rotor flux, more starts are possible per unit time.

The object is also achieved by way of a soft starter according to the invention. The soft starter has a firing signal unit for generating firing signals and the thyristors. The firing signal unit may be initiated to generate firing signals for one or more of the thyristors. The soft starter additionally has means suitable for carrying out the steps of the described method. These means may be e.g. a control unit that has a computing unit and a storage unit. A computer program may be loaded into the storage unit and permanently stored there, from where it may be loaded into the computing unit for execution.

The outlined objective is additionally achieved by way of a computer program product according to the invention and a computer-readable medium on which the computer program product is stored. The computer program product is designed to be executable in at least one processor. The computer program product may be in the form of software, e.g. in the form of an app downloadable from the Internet, or in the form of firmware storable in a memory and executable by a processor or an arithmetic and logic unit. Alternatively or additionally, at least part of the computer program product may also be in the form of a hardwired circuit, for example in the form of an ASIC (ASIC=application-specific integrated circuit). The computer program product according to the invention comprises instructions that cause the soft starter according to the invention to carry out the method steps of the described method. The computer program product is thus designed to perform the method for operating an asynchronous motor by means of a soft starter. In particular, it is designed to perform the step of ascertaining firing opportunities possible for one or more thyristors of the soft starter at a calculation time in the future. Additionally, it is designed to carry out the step of forecasting for the ascertained firing opportunities the electrical and/or mechanical motor behavior if a firing of one or more thyristors of the soft starter were performed. Additionally, it is designed to carry out the step of taking the forecast motor behavior as a basis for deciding whether and which firing opportunity is supposed to be chosen. Additionally, the computer program product comprises instructions that cause the firing signal unit of the soft starter according to the invention to generate one or more firing signals for one or more thyristors if the decision has been made to take a firing opportunity. According to the invention, the computer program product is designed to implement and perform at least one embodiment of the outlined method. In this case, the computer program product may combine all of the subfunctions of the method, that is to say may be in monolithic form. Alternatively, the computer program product may also be in segmented form and distribute particular subfunctions over segments that are executed on separate hardware. As such, the computer program product may be designed to be executable partly in a control unit of the soft starter and partly in an external control unit. Additionally, one part of the method may be performed in a soft starter device and another part of the method in a control unit that is superordinate to the soft starter device, such as for example a PLC, a handheld configuration device or a computer cloud.

The above-described properties, features and advantages of this invention and the way in which they are achieved will become clearer and more clearly understood in association with the description below of the exemplary embodiments that are explained in greater detail in association with the figures. Here in schematic illustration:

DETAILED DESCRIPTION OF THE INVENTION

Figure 1:
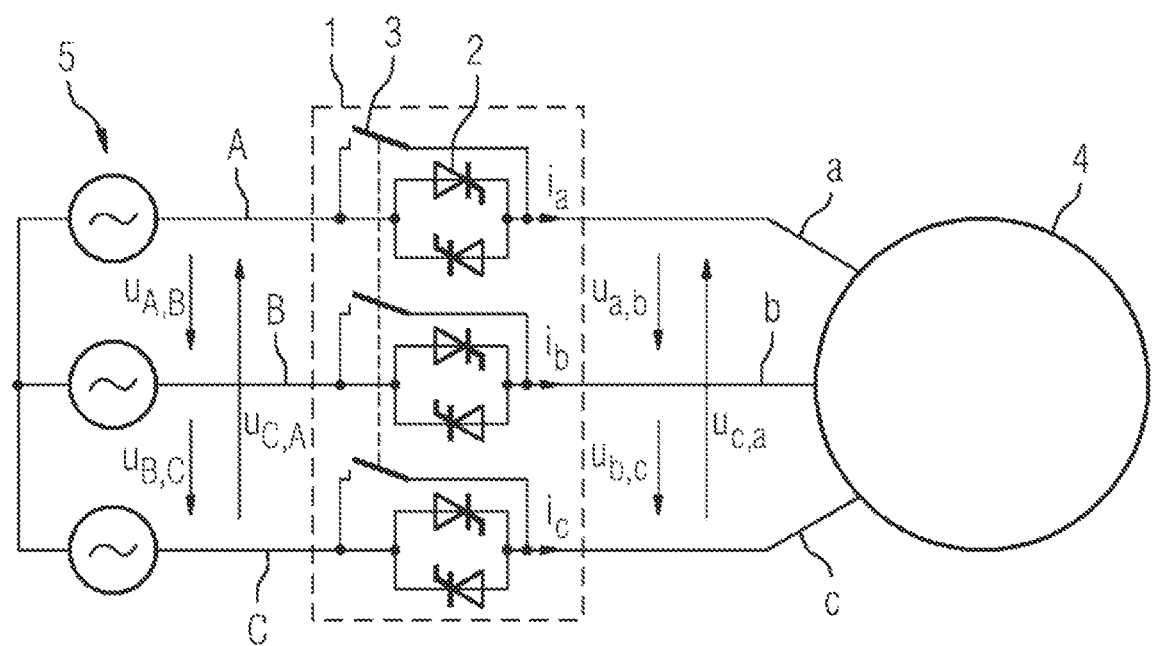
FIG. 1 shows a typical soft starter topology with a soft starter for starting a motor.
Figure 2:
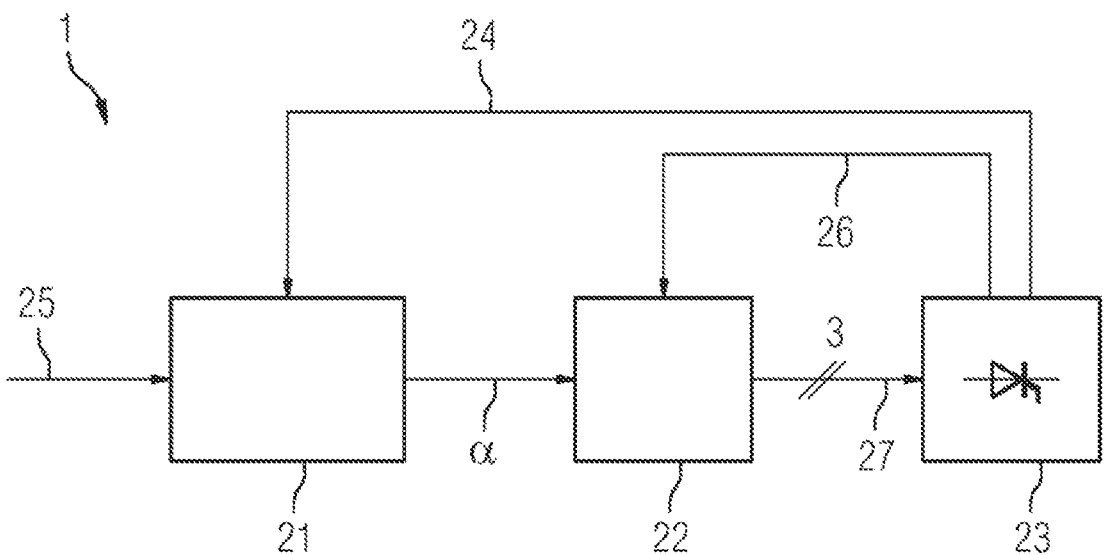
FIG. 2 shows a block diagram of a soft starter.
Figure 3:
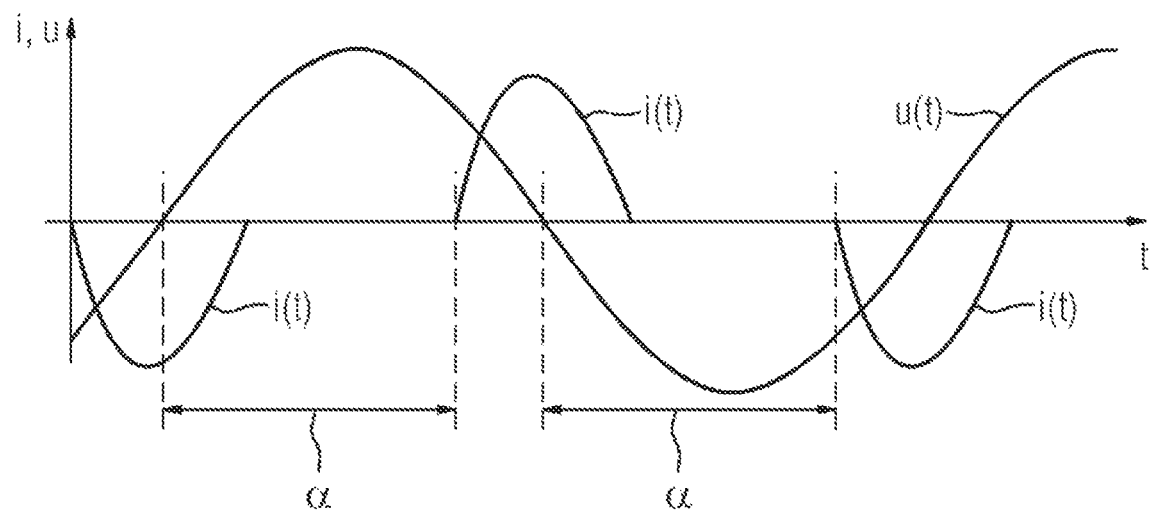
FIG. 3 shows the relationship between the voltage across the thyristor, the current flowing through the thyristor and the firing angle as a function of time.
Figure 4:
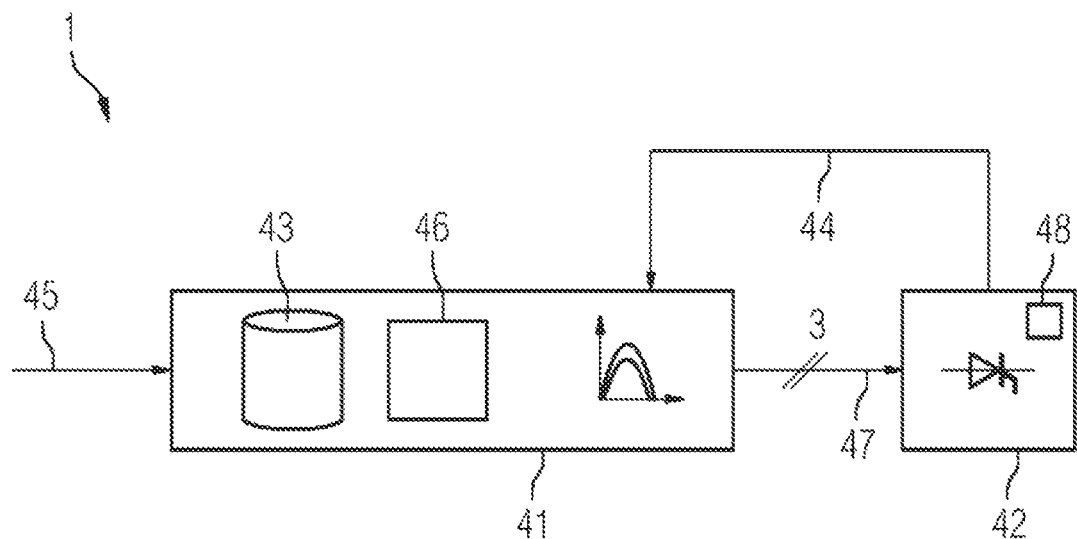
FIG. 4 shows a soft starter according to one configuration of the invention.

FIG. 4 shows the structure of a soft starter 1 according to one configuration of the invention. The soft starter 1 may be used for example in a topology as shown in FIG. 1. The soft starter 1 has a control unit 41 having a computing unit 46, also referred to as a processor, and a storage unit 43. The computing unit 46 executes a computer program that is stored in the storage unit 43 and contains an algorithm for carrying out the method. Execution of the algorithm results in firing opportunities being ascertained for at least one next time step, a motor model being used to anticipate the electrical and/or mechanical motor behavior corresponding to the firing opportunities, and finally the forecast motor behavior being taken as a basis for deciding whether and which firing opportunity is supposed to be chosen. To initialize the algorithm, state variables of the system are measured or calculated. The computing unit 46 receives a series of measured values 44, e.g. the motor current $I_{1,RMS}$, the motor voltage $U_{1,RMS}$ and the speed n of the rotor, as input values. Grid voltages $U_A$, $U_B$, $U_C$ are measured in order to calculate the grid angle $\varphi_{grid}$ and the grid voltage amplitude $U_{grid}$. The motor currents $i_a$, $i_b$, $i_c$ and motor voltages $u_a$, $u_b$, $u_c$ are also used for a model-based calculation of the rotor flux. Together with the measured mechanical rotor speed n and the grid frequency $f_{grid}$, all system variables are defined. After the prediction, it is clear which opportunities for firing there are at the time under consideration in the future, i.e which firing opportunities. These firing opportunities may then be checked for a multiplicity of decision criteria 45, e.g. a maximum torque or a maximum stator current, and rated. If the decision has been made for a specific firing opportunity, the controller 41 generates one or more initiation signals 47 to a firing block 42 of the soft starter, which has thyristors and a firing signal unit 48 for generating firing signals for the thyristors. The initiation signals 47 cause the firing signal unit 48 to generate firing signals for one or more thyristors, as a result of which the anticipated motor behavior is established.

A standard model for induction motors is used for prediction below as an exemplary embodiment of the method according to the invention. In principle, it will be pointed out here that it is by no means imperative for it to be the motor model shown here that is used to predict the behavior of the motor. Simplified models that e.g. ignore factors such as leakage fluxes, allow for current displacement effects in the rotor or have variables other than state variables may likewise be used here, of course. To calculate two-phase firings, the model states need to be rotated in a suitable manner or the missing third conductor voltage needs to be calculated separately.

The subscript index 1 indicates that a value is a stator parameter and the subscript index 2 indicates that a value is a rotor parameter. The superscript index K indicates that a value has been rotated through the rotation angle $\Omega_K$ in the reference system:

$$\vec{i}_1^K = \vec{i}_1^S \cdot e^{-j\varphi_K} \quad (3)$$

The motor model comprises the stator resistance $R_1$, the stator leakage inductances $L_{1\sigma}$, the mutual inductance $L_h$, the rotor resistance $R_2$ and the rotor leakage inductances $L_{2\sigma}$. For the sake of simplicity, the rotor parameters are referenced to the stator side. The electrical rotor speed is defined as $\Omega_L$ and the rotation speed of the reference system as $\Omega_K$. The inductances are defined as:

$$L_1 = L_{1\sigma} + L_h \quad (4)$$

$$L_2 = L_{2\sigma} = L_{2\sigma} + L_h \quad (5)$$

Equations (6) and (7) show a model of a general induction motor, based on the rotor magnetic flux linkage $\vec{\Psi}_2^K$ and the stator magnetic flux linkage $\vec{\Psi}_1^K$ as state variables:

$$\vec{U}_1^K = R_1 \cdot \vec{i}_1^K + \frac{d\vec{\Psi}_1^K}{dt} + j \cdot \Omega_K \cdot \vec{\Psi}_1^K \quad (6)$$

$$\vec{U}_2^K = R_2 \cdot \vec{i}_2^K + \frac{d\vec{\Psi}_2^K}{dt} + j \cdot (\Omega_K - \Omega_L) \cdot \vec{\Psi}_2^K \quad (7)$$

The magnetic flux linkage can be calculated on the basis of the stator and rotor currents:

$$\vec{\Psi}_1^K = L_1 \cdot \vec{I}_1^K + L_h \cdot \vec{I}_2^K \qquad (8)$$

$$\vec{\Psi}_2^K = L_h \cdot \vec{I}_1^K + L_2 \cdot \vec{I}_2^K \qquad (9)$$

The motor torque is defined as:

$$M_M = \frac{3}{2} \cdot p \cdot \vec{\Psi}_1^K \times \vec{I}_1^K \qquad (10)$$

Assuming a squirrel-cage induction motor, a short circuit on the rotor side can be estimated:

$$\vec{U}_2^K = 0 \qquad (11)$$

Additionally, there is no advantage in continuously rotating the reference frame for predictive calculations, as is often done in the motor controller. The rotation speed of the reference system is therefore set equal to zero:

$$\frac{d_{\varphi K}}{dt} = \Omega_K = 0 \qquad (12)$$

For a compact description of the model, it is additionally useful to define the leakage factor σ:

$$\sigma = 1 - \frac{L_h^2}{L_1 \cdot L_2} \qquad (13)$$

From equation (9), it follows that:

$$\vec{I}_2^K = -\frac{L_h}{L_2} \cdot \vec{I}_1^K + \frac{1}{L_2} \cdot \vec{\Psi}_2^K \qquad (14)$$

In equations (6) and (7), the rotor magnetic flux linkage $\vec{\Psi}_2^K$ and the stator magnetic flux linkage $\vec{\Psi}_1^K$ are defined as state variables. Only the stator current are measured in the soft starter shown in FIG. 1. These currents are a system property that is necessary for initializing the prediction model. In order to reduce the effort for calculating the magnetic flux on the basis of the measured currents, it is advantageous to have the current space vector as a stator state variable. Equations (6) and (9) are therefore used to obtain the stator current $\vec{I}_1^K$ as a new system-dynamic state variable:

$$\frac{d\vec{I}_1^K}{dt} = \frac{1}{\sigma \cdot L_1} \cdot \vec{U}_1^K - \frac{R_1}{\sigma \cdot L_1} \cdot \vec{I}_1^K + \frac{R_2 \cdot L_h}{\sigma \cdot L_1 \cdot L_2} \cdot \vec{I}_2^K - j \cdot \frac{\Omega_L}{\sigma \cdot L_1} \cdot \vec{\Psi}_2^K \qquad (15)$$

$$\frac{d\vec{I}_2^K}{dt} = -R_2 \cdot \vec{I}_2^K + j \cdot \Omega_L \cdot \vec{\Psi}_2^K \qquad (16)$$

To reduce the computation complexity, equation (14) is integrated into equations (15) and (16):

$$\frac{d\vec{I}_1^K}{dt} = \qquad (17)$$

$$\frac{1}{\sigma \cdot L_1} \cdot \vec{U}_1^K - \frac{R_1 \cdot L_2^2 - R_2 \cdot L_h^2}{\sigma \cdot L_1 \cdot L_2^2} \cdot \vec{I}_1^K + \frac{R_2 \cdot L_h}{\sigma \cdot L_1 \cdot L_2^2} \cdot \vec{\Psi}_2^K - j \cdot \frac{\Omega_L}{\sigma \cdot L_1} \cdot \vec{\Psi}_2^K$$

$$\frac{d\vec{\Psi}_2^K}{dt} = \frac{R_2 \cdot L_h}{L_2} \cdot \vec{I}_1^K - \frac{R_2}{L_2} \cdot \vec{\Psi}_2^K + j \cdot \Omega_L \cdot \vec{\Psi}_2^K \qquad (18)$$

Torque equation (10) is remodelled to produce the new system state variables using equations (8) and (9):

$$M_M = \frac{3}{2} \cdot p \cdot \frac{L_h}{L_2} \cdot \vec{\Psi}_2^K \times \vec{I}_1^K \qquad (19)$$

Equations (17), (18) and (19) represent the whole system model. For a 3-phase firing case, this model can be used to calculate the electrical and mechanical motor behavior by taking the grid voltage $\vec{U}_{grid}^S$ as stator voltage $\vec{U}_1^K$.

It is likewise possible to calculate a 2-phase firing on the basis of this model, but additional effort needs to be made for this. If e.g. the thyristors in phases a and b are fired, the voltage across the thyristor in phase C needs to be computed in parallel. This calculation must satisfy the condition $i_c=0$ because the thyristor in phase c is still blocking the current. The calculation therefore becomes even more time-consuming because the voltage needs to be calculated in each prediction step.

Figure 5A:
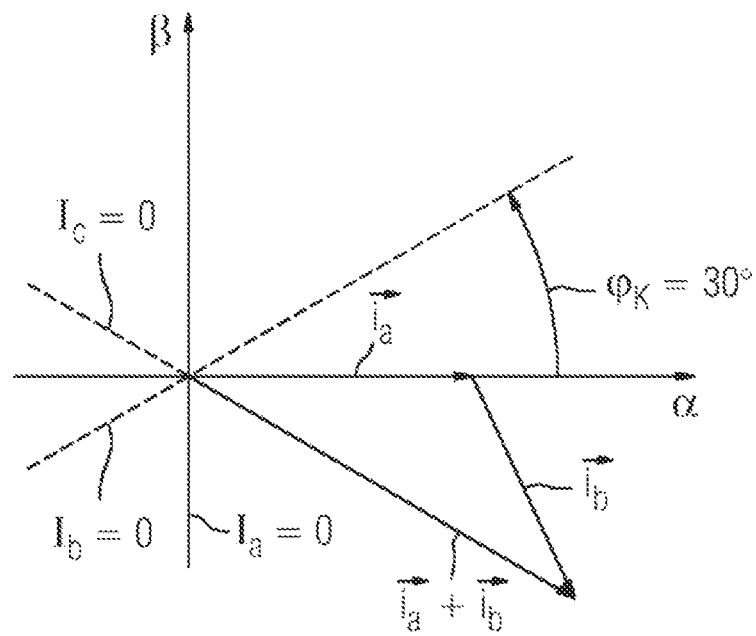
FIG. 5a is a graph containing a generated current vector.
Figure 5B:
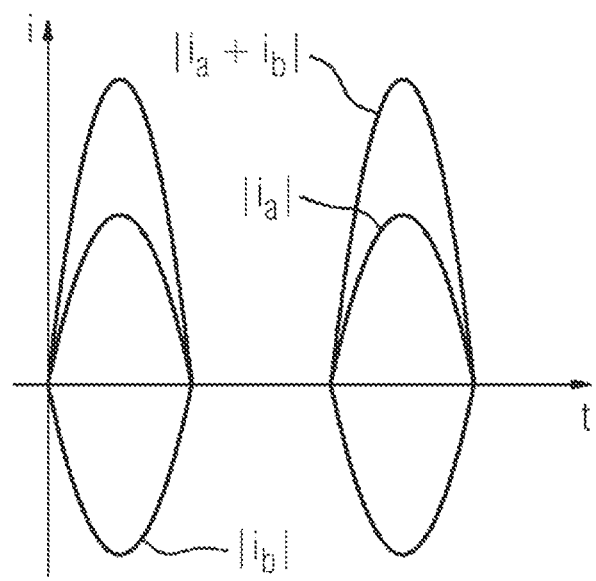
FIG. 5b is a graph containing the absolute values of the generated current vector.

To reduce this computation complexity, the following approach may be chosen. If the thyristors in two of the three grid phases are fired, they turn on, whereas the thyristor in the third phase remains off. Because the sum of the currents in all three phases must always be zero, the current flowing to the motor in one of the conductive phases needs to be identical to the current flowing away from the motor in the other conductive phase; the current levels in the two conductive phases are therefore exactly the same, only with opposite arithmetic signs. FIG. 5a and FIG. 5b relate to a 2-phase firing of phases a and b. In FIG. 5a, in a fixed α-β reference frame, it is evident that this condition leads to a pulsating current vector that varies in length but not in direction. Therefore, only the absolute value of the current vector $|\vec{I}_1^K|$ varies. FIG. 5b shows a graph containing the absolute values of the generated current vector.

If the direction is fixed and only the absolute value of the current state vector varies, it is no longer necessary to describe the current as a complex variable. By rotating all system state variables through an angle $\varphi_P$ that is dependent on the firing combination, the equations may be simplified. A prediction reference frame for this rotation is defined using the rotation angle $\varphi_P$:

$$\vec{I}_1^P = \vec{I}_1^S \cdot e^{-j\varphi_P} \qquad (20)$$

System equations (17), (18) and (19) are defined in the prediction reference frame as follows:

$$\frac{d\vec{I}_1^P}{dt} = \qquad (21)$$

-continued $$\frac{1}{\sigma \cdot L_1} \cdot \vec{U}_1^K - \frac{R_1 \cdot L_2^2 - R_2 \cdot L_h^2}{\sigma \cdot L_1 \cdot L_2^2} \cdot \vec{I}_1^P + \frac{R_2 \cdot L_h}{\sigma \cdot L_1 \cdot L_2^2} \cdot \vec{\Psi}_2^P - j \cdot \frac{\Omega_L}{\sigma \cdot L_1} \cdot \vec{\Psi}_2^P$$

$$\frac{d\vec{\Psi}_2^P}{dt} = \frac{R_2 \cdot L_h}{L_2} \cdot \vec{I}_1^P - \frac{R_2}{L_2} \cdot \vec{\Psi}_2^P + j \cdot \Omega_L \cdot \vec{\Psi}_2^P \quad (22)$$

$$M_M = \frac{3}{2} \cdot p \cdot \frac{L_h}{L_2} \cdot \vec{\Psi}_2^P \times \vec{I}_1^P \quad (23)$$

The rotation angle $\varphi_P$ is dependent on the firing combination in the thyristors. For the three possible 2-phase firing combinations:
1. firing of phases a and b,
2. firing of phases b and c,
3. firing of phases a and c,
the rotation angles $\varphi_P$ in the prediction reference frame are:

$$\varphi_{P,a-b} = \frac{1}{6}\pi, \quad \varphi_{P,b-c} = \frac{1}{2}\pi, \quad \varphi_{P,c-a} = -\frac{5}{6}\pi \quad (24)$$

This method has a few advantages compared to calculation of the third voltage. Firstly, the third additional voltage of the zero-current phase does not need to be calculated for each prediction step. Secondly, the motor model as such also becomes simpler because equation (17) does not need to be solved twice, once for the real part and once for the imaginary part. Owing to the rotation through the constant rotation angle $\varphi_P$, only the real part in equation (17) is left for calculating the 2-phase firing. If one of the on states of one of the thyristors is changed, the states of equations (17) and (18) and the grid input voltage vector $\vec{U}_{grid}$ need to be rotated through the new angle $\varphi_P$.

Calculation of the electrical and mechanical motor behavior requires the actual rotor magnetic flux linkage $\vec{\Psi}_2^K$ as a state variable of the motor, see equation (18). As it is not possible to measure the rotor magnetic flux linkage $\vec{\Psi}_2^K$ using conventional hardware equipment of a soft starter, a magnetic flux model is required in order to calculate the rotor magnetic flux linkage. Therefore, equation (18) is implemented using the measured stator currents $\vec{I}_1^K$ as input value for tracking the rotor magnetic flux linkage. The value of the rotor magnetic flux linkage is also used in the next section to calculate a torque and a magnetic flux generation current ($I_{1q}$ and $I_{1d}$). Together, they represent the stator current state vector, while $\varphi_K$ is equal to the angle of $\vec{\Psi}_2^P$:

$$\vec{I}_1^K = I_{1q} + jI_{1d} \quad (25)$$

This approach can be used to simplify torque equation (10):

$$M_M = \frac{3}{2} \cdot p \cdot \Psi_{1d} \cdot I_{1q} \quad (26)$$

For all calculations, it is assumed that the rotor speed $\Omega_L$ is constant up to the forecast horizon. This assumption results in acceptably small errors in the forecast, because the mass inertias of the motor and the load are usually large enough to keep the rotor speed stable up to the forecast horizon of less than 20 ms.

All firing opportunities are calculated in the prediction step. The different firing opportunities result in different time responses for the torque and the currents. Based on these time responses and further decision criteria, it is then necessary to decide whether or not a specific firing opportunity is useful.

The main reason for using a soft starter is the resultant possible limiting of current and torque, as a result of which the grid and the application are not damaged by the motor starting. The decision criteria should therefore include a maximum current amplitude $i_{p,max}$ and a maximum torque amplitude $M_{p,max}$. Additionally, a minimum mean torque $M_{p,avgmin}$ ensures that only firing opportunities that accelerate the rotor are accepted. Down times in the firing hardware and inaccuracies in the voltage zero crossing detection mean that it is additionally useful to define a minimum on-time $t_{p,mc}$ for the thyristors. Firing opportunities that result in conduction ending before this minimum on-time $t_{p,mc}$ has elapsed are rejected.

Additionally, it is necessary to keep the amplitude of the rotor magnetic flux linkage $|\vec{\Psi}_2^K|$ at a useful level in order to have the opportunity to generate a torque using the stator currents. To this end, a minimum value for the rotor flux linkage $\Psi_{p,free}$ is defined in order to ensure a specific level of magnetic flux in the rotor. At this level, each firing needs to yield an increase in the rotor magnetic flux of $\Psi_{p,\Delta min}$. This increases the rotor magnetic flux linkage until the minimum value for the rotor flux linkage $\Psi_{p,free}$ has been reached again. Using these rules, it is possible to start up the induction motor.

When start-up of the induction motor begins, the rotor is idle and is not magnetized. To produce a torque, it is necessary for there to be a specific level of magnetic flux in the rotor. The thyristors are therefore fired with a 2-phase firing one or more times at the beginning of start-up in order to generate a defined level of rotor magnetic flux, see FIGS. 5a and 5b.

Measurements to Demonstrate Performance

The section below shows two measurements that illustrate a different behavior between the classic and predictive methods.

This measurement shows starting using a classic starting method. Here, the current passes through the predefined firing angle in a recurring symmetrical pattern. The speed also rises continuously.

This measurement shows starting using a predictive method. The form of the decision criterion means that the firing of the thyristors behaves completely differently.

First, the rotor is magnetized, characterized by uniform current pulses at the beginning. Then, after approximately 180 ms, the actual starting algorithm begins. Here, the current is unstable and occurs more or less "in packets". The acceleration is also reminiscent of steps, in particular for low speeds. Allowing for the fact that forward losses occur in thyristors only when a current flows, it becomes clear that the losses in the thyristors are much smaller in the case of this starting than in the case of the comparable classic starting process. The same applies at least for the stator winding of the motor.

Figure 6A:
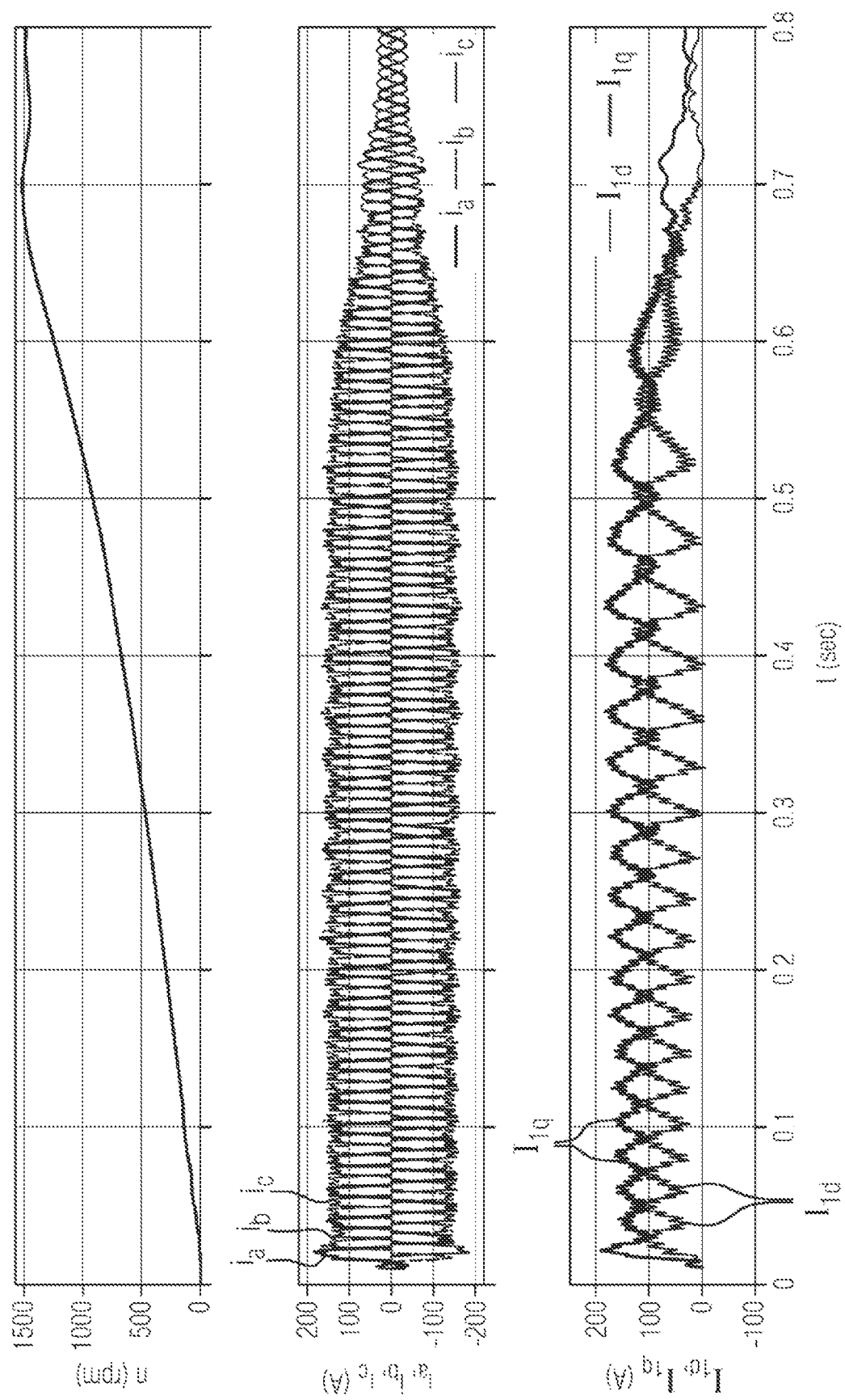
FIG. 6a shows a start-up using the conventional starting algorithm with a constant load torque $M_L$ of 30 Nm.
Figure 6B:
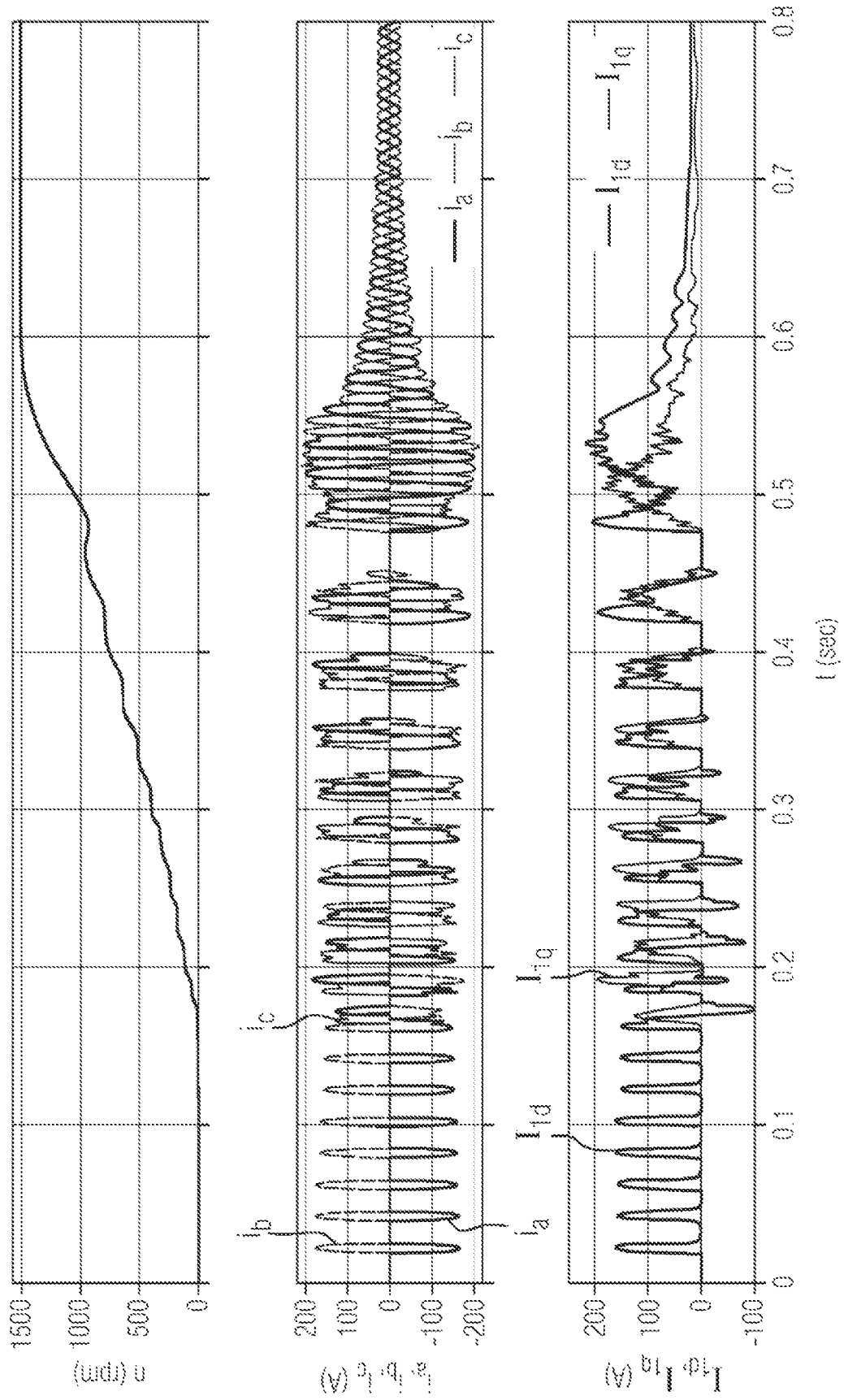
FIG. 6b shows a start-up using an embodiment of the predictive starting algorithm according to the invention with a constant load torque $M_L$ of 30 Nm.

FIGS. 6a and 6b show a comparison of the behavior of a conventional algorithm and that of an algorithm according to the invention that run on a soft starter motor system as shown in FIG. 1. The measurements of the voltages and currents are taken using Hall sensors connected to an RCP system, comprising a CPU for handling the algorithm (CPU=central processing unit; RCP=rapid controller prototyping). The measured values shown were recorded using a commercially available multichannel power meter for measuring physical values. The rotor speed is measured using an inductive position sensor. Table 1 contains the motor data of the normal squirrel-cage induction motor that is used.

TABLE 1 motor data for the standard model of the squirrel-cage induction motor that is used

| | |
|---|---|
| nominal power, $P_N$ | 15 kW |
| nominal voltage, $U_N$ | 230 V |
| nominal current, $U_N$ | 28.5 A |
| nominal frequency, $f_N$ | 50 Hz |
| number of pole pairs, p | 2 |
| motor inertia, $J_M$ | 0.0850 kgm$^2$ |
| load inertia, $J_L$ | 0.0955 kgm$^2$ |
| stator DC resistance, $R_1$ | 0.150 Ohm |

The induction motor is mechanically connected to a permanent-magnet servo motor powered by a high-performance servo inverter. This inverter may be used to simulate mechanical loads having different characteristics. The moment of inertia from the servo load simulation is relatively low compared to typical industrial applications; this leads to relatively fast t start-up of the motor and a few oscillations, in particular for the classic algorithm measurements in FIGS. 6a and 7a.

FIG. 6a shows a measurement for a start-up of a soft starter motor system, wherein a conventional algorithm is used and an application with a constant load torque $M_L$ of 30 Nm is actuated.

The voltage value is predefined by a ramp generator that begins at a relative starting voltage of 55% of the nominal motor voltage $U_N$. The voltage is then increased with a continuous gradient of 25% per sec. The inertial mass of the motor and the load is accelerated using the difference between the motor torque $M_M$ and the load torque $M_L$. This acceleration increases with the motor speed, i.e. the speed n, and has a more or less constant shape: the speed n increases continuously. The current profile $i_a$, $i_b$, $i_c$ is a constantly repeating sequence that differs only in the firing angle and a few oscillations. The current passes through the predefined firing angle in a recurring symmetrical pattern. Additionally, the d currents $I_{1d}$ and q currents $I_{1q}$ in the rotor magnetic-flux-oriented stator currents are indicated. These values are calculated from the measured stator currents and the reconstructed flux values of the rotor magnetic flux model. The current $I_{1d}$ vector is divided into the field-generating current $I_{1d}$ and the torque-producing current $I_{1q}$. Ignoring the oscillations on the currents, the field-generating current is higher than the torque-producing current. Owing to the more or less identical maximum current value per phase, the mean values of the d and q currents also remain constant.

Equation (26) shows that the present motor torque $M_M$ is dependent on the q current and the level of the rotor magnetic flux. Even if the q current remains at the same level, more or less torque can be produced by influencing the rotor magnetic flux. This is the reason for the rising acceleration at higher rotor speeds without a significantly higher q current occurring.

Figure 7A:
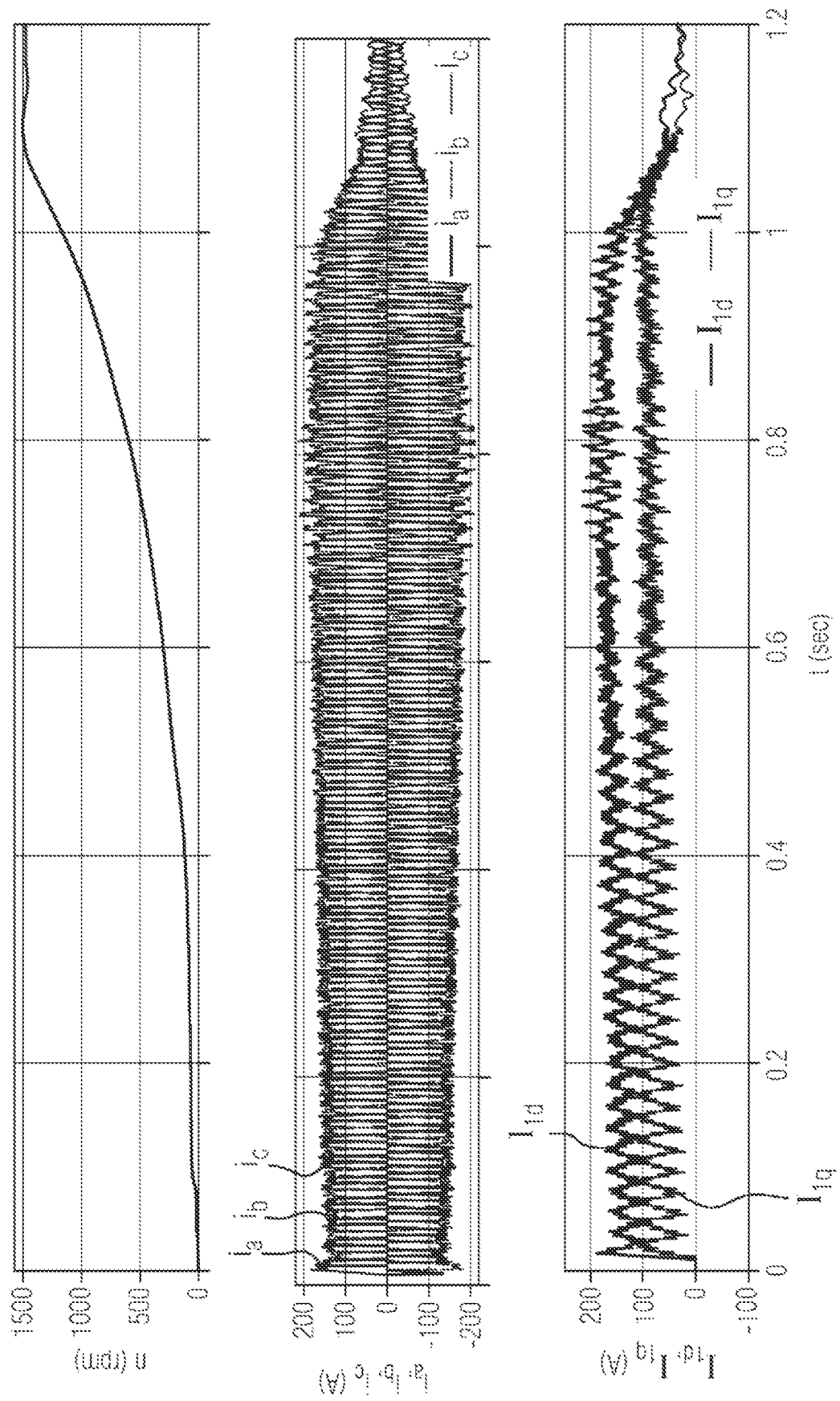
FIG. 7a shows a start-up using the conventional starting algorithm with a constant load torque $M_L$ of 70 Nm.

FIG. 7a shows a further start-up using the conventional algorithm, with a higher constant load torque $M_L$ of 70 Nm. The other constraints are as described for FIG. 6a.

FIG. 6b shows a measurement for a start-up of a soft starter motor system, wherein a prediction algorithm according to the invention is used. The load and grid conditions correspond to those of the conventional algorithm from FIG. 6a. The load torque $M_L$ is constantly 30 Nm.

Before the prediction algorithm starts, the start-up sequence has a special section added: first, the rotor is magnetized, characterized by uniform current pulses at the beginning. A few 2-phase firings take place in order to generate the rotor magnetic flux linkage $|\vec{\Psi}_2^K|$. This leads to a current space vector, the direction of which is rigid, but the amplitude of which pulsates, see FIGS. 5a and 5b, which continuously increases the amplitude of the rotor magnetic flux linkage $|\vec{\Psi}_2^K|$. Since only rotor magnetic flux is generated and no motor torque $M_M$ is produced, a pure d current is present in this section of the start-up sequence. In the time period from t=0 s to t=0.18 s, said current serves as a prerequisite for the production of torque in the next part of the start-up sequence.

The algorithm according to the invention then begins to run: here, the current is unstable and occurs more or less "in packets". Compared to start-up using the conventional algorithm, there is no continuous firing profile, but rather time periods alternately with and without current. This also leads to a difference in the acceleration behavior. The acceleration is not as uniform as with a soft starter as controlled by a conventional algorithm, but rather has a stepped shape, in particular for low speeds: there are time periods during start-up in the acceleration is relatively high (time periods with a flow of current), and time periods without acceleration (time periods without a flow of current). Additionally, the d and q currents have a different shape. Here too, there are time periods with and without current.

In addition, the relationship between the levels of the d and q currents is different than that in the case of the conventional start-up. The d current is much smaller compared to the conventional algorithm. The d current is also smaller than during start-up using the conventional algorithm. This indicates that the linked rotor magnetic flux is higher when the prediction algorithm is used.

Figure 7B:
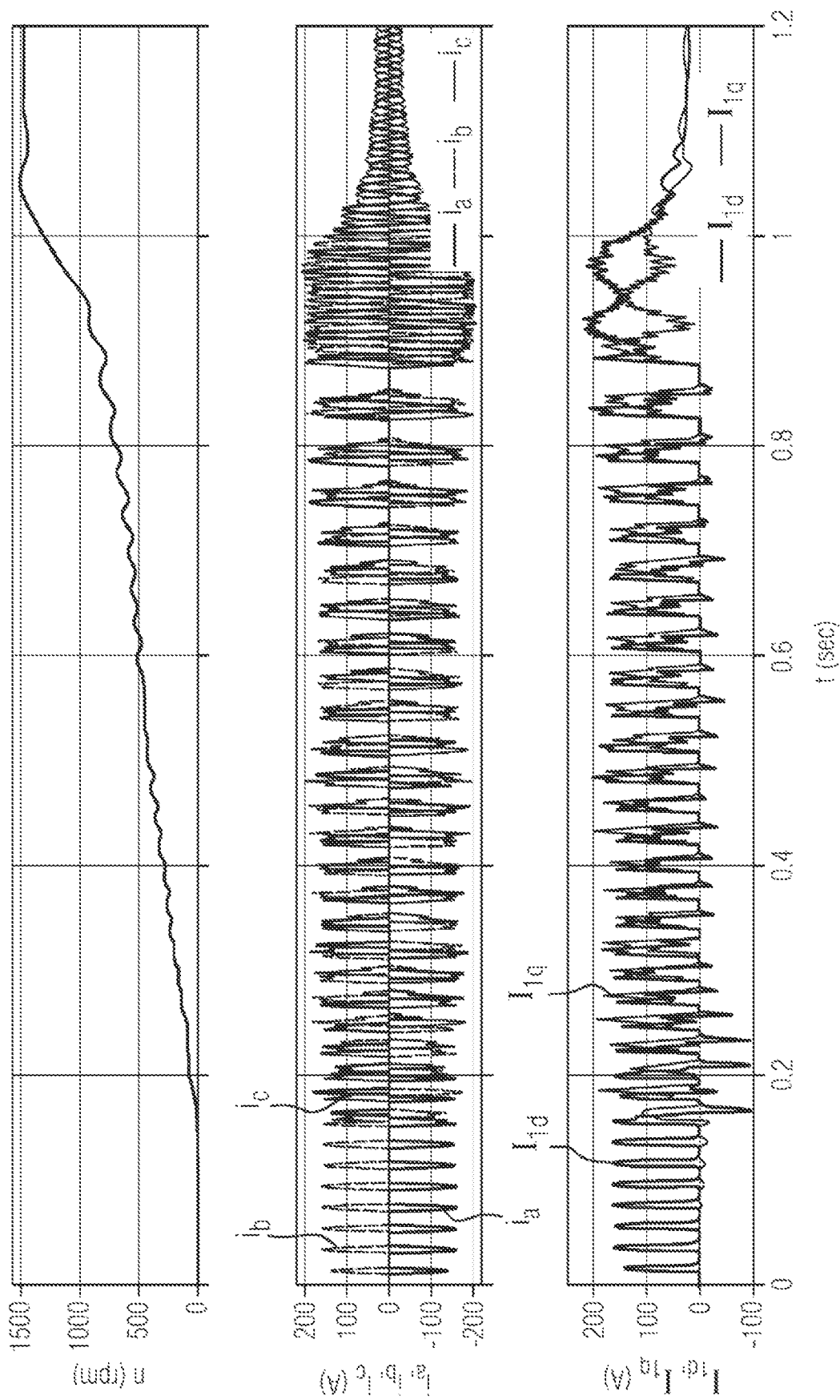
FIG. 7b shows a start-up using an embodiment of the predictive starting algorithm according to the invention with a constant load torque $M_L$ of 70 Nm.

FIG. 7b shows a further start-up using the prediction algorithm, with a higher constant load torque $M_L$ of 70 Nm. The main parts of the start-up sequence are similar to those of the sequence using the prediction algorithm with the lower load torque $M_L$ of 30 Nm. In the time period from t=0 s to t=0.18 s, the absolute rotor magnetic flux linkage $|\vec{\Psi}_2^K|$ increases. The same pulsating behavior as in FIG. 6b is then evident. Starting at t=0.88 s up until synchronization at t=1.1 s, however, a behavior is visible that differs significantly from the behavior previously. In this time period of the start-up, the response changes and the current response is similar to the current response with the conventional algorithm. This is possible only because the requirements of the decision criteria are also met by the behavior with the conventional algorithm. Before this time period of the start-up, the firings using the conventional algorithm do not fit the decision criteria. For example, the criterion of minimum magnetic flux cannot be satisfied with a firing using the conventional algorithm. The prediction algorithm achieves the same result in a different way than the simpler firing-angle-based solution, because the conventional solution meets the requirements of the decision criteria in the last time period of the start-up.

When comparing the current curves of the conventional algorithm and the prediction algorithm according to the invention, it becomes clear that the prediction algorithm leads to a start-up with a shorter current conduction time. As a result, the losses in the thyristors of the soft starter and in the power lines of the induction motor are also lower. To assess the losses $P_{thy}$ in the thyristors, a simple model is used that is based on the forward voltage $U_f$ and the thyristor-internal resistance $R_{on}$ (thyristor dynamic resistance):

$$P_{thy}(I_{thy})=I_{thy} \cdot U_f + R_{on} \cdot I_{thy}^2 \qquad (27)$$

The parameters of the thyristor module used are summarized in table 2.

TABLE 2 technical data for the thyristor module used

| | |
|---|---|
| forward voltage, $U_f$ | 0.9 V |
| thyristor dynamic resistance, $R_{on}$ | 2 mOhm |

For the sake of simplicity, only the resistive stator losses are compared, because they can be calculated relatively easily using the resistance $R_1$ of the stator windings.

Tables 3 and 4 provide the calculated losses, separated as thyristor losses and resistive stator losses, for a start-up of the motor with a constant load torque of 30 Nm and 70 Nm, for start-up using a conventional algorithm (classic start-up) and start-up using the predictive algorithm (predictive start-up). The values were calculated on the basis of the measurements shown in FIGS. 5a, 5b, 6a and 6b. The time period for the energy measurement starts with the first firing signal and ends when a steady-state current is reached.

TABLE 3 calculated losses for the measurement with a constant load torque of 30 Nm

| | Classic Start-up | Predictive Start-up |
|---|---|---|
| Thyristor losses | 213 J | 108 J |
| Resistive stator losses | 3537 J | 1741 J |

TABLE 4 calculated losses for the measurement with a constant load torque of 70 Nm

| | Classic Start-up | Predictive Start-up |
|---|---|---|
| Thyristor losses | 414 J | 209 J |
| Resistive stator losses | 7614 J | 3585 J |

Tables 3 and 4 show that the thyristor losses can be reduced by almost 50% under both load conditions using the predictive algorithm compared to the conventional algorithm. The resistive stator losses were also halved.

Both cases show that the invention makes it possible to reduce the losses in the soft starter and in the induction motor during the starting process. This allows more starts to be performed per unit time, cooling to be reduced and therefore smaller soft starters to be built and, if an application is started often, energy to be saved.

Figure 8:
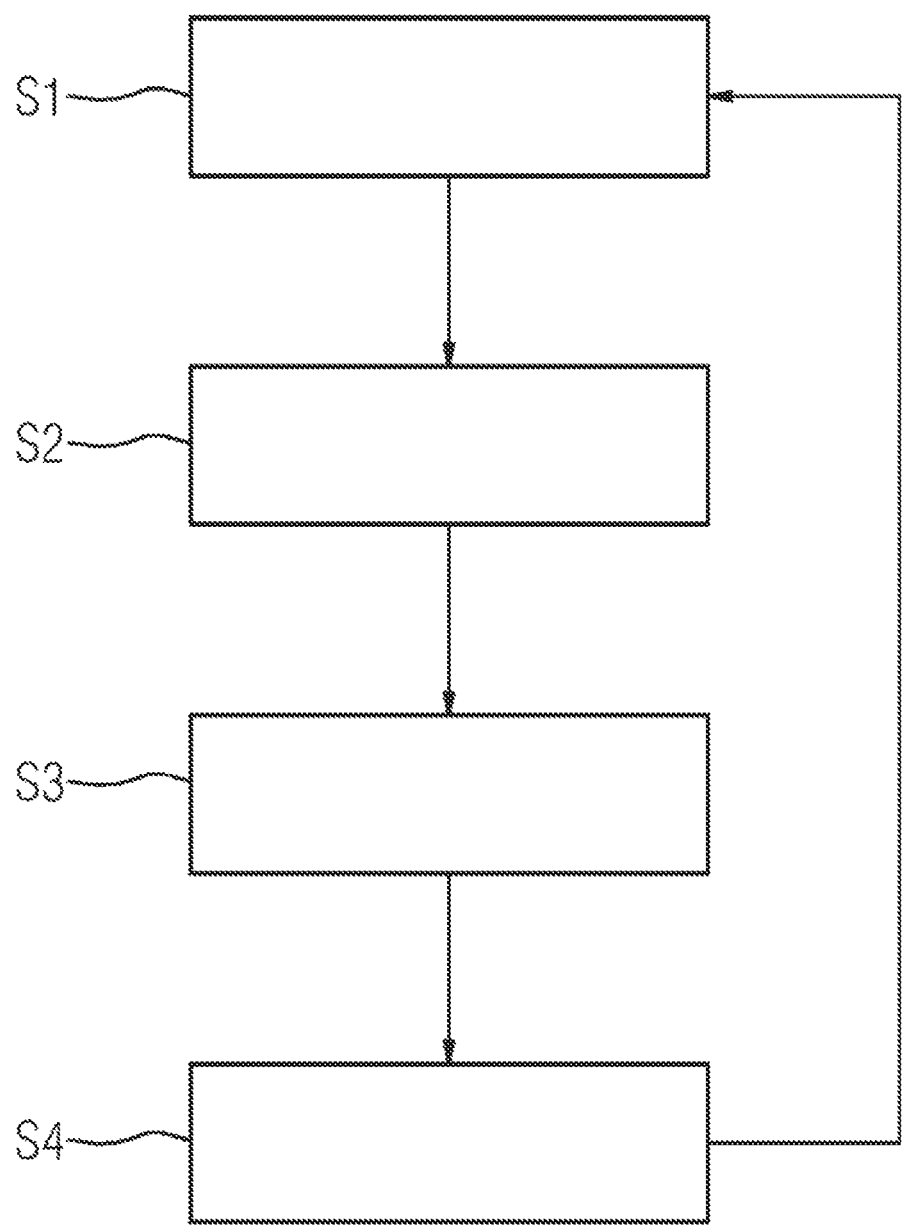
FIG. 8 shows a flowchart according to an embodiment of the method according to the invention.

FIG. 8 shows a flowchart for a method comprising method steps S1 to S4 for operating an ASM with a soft starter.

A first method step S1 comprises ascertaining firing opportunities possible for one or more thyristors of the soft starter at a calculation time in the future. After the first method step S1, a second method step S2 is carried out.

The second method step S2 comprises forecasting for the ascertained firing opportunities an electrical and/or mechanical motor behavior if a firing of one or more thyristors of the soft starter were performed. After the second method step S2, a third method step S3 is carried out.

The third method step S3 comprises using the forecast motor behavior to decide whether and which firing opportunity is supposed to be chosen.

The fourth method step S4 comprises generating one or more firing signals for one or more thyristors if the decision has been made to take a firing opportunity. After the fourth method step S4, the method is continued with the first method step S1.

The invention claimed is:

1. A method for starting and stopping an asynchronous motor by a soft starter comprising thyristors connected in antiparallel in switchable phases, the method comprising the following steps:
    ascertaining all firing opportunities available for the thyristors of the soft starter at a calculation time in the future;
    forecasting, for all the firing opportunities thus ascertained, an electrical and/or mechanical motor behavior corresponding to the firing opportunities;
    deciding, based on the motor behavior thus forecast, whether and which firing opportunity is to be chosen;
    if a decision has been made to take a specific firing opportunity, generating one or more firing signals for one or more thyristors as a result of which anticipated motor behavior is established;
    repeatedly ascertaining a present rotor angle, a present rotor speed, a present grid phase angle, and present stator phase currents;
    using the present rotor angle, the present rotor speed, the present grid phase angle, and the present stator phase currents to anticipate a torque response for a torque acting on a rotor for first firing opportunities, in which a firing of thyristors turns on two phases, and for a second firing opportunity, in which firing of thyristors turns on three phases; and
    using the torque responses thus anticipated to decide whether each thyristor is fired.

2. The method according to claim 1, which comprises ascertaining the firing opportunities for a respectively following time step.

3. The method according to claim 1, which comprises modelling the motor behavior by a transient motor model.

4. The method according to claim 1, wherein the deciding step comprises making a decision based on one or more decision criteria selected from the group consisting of: maximum stator current, maximum torque, minimum on-time for thyristors, minimum average torque, maximum rotor flux, minimum rotor flux growth as a result of the firing, thyristor losses, and motor losses.

5. The method according to claim 1, which comprises not firing at an immediate next calculation time and awaiting the forecast for a calculation time that follows the immediate next calculation time if a decision is made that a firing opportunity is not useful.

6. The method according to claim 1, which comprises ascertaining only firing opportunities that result in negative torques that actively slow down the asynchronous motor.

7. The method according to claim 1, which comprises preceding the step of ascertaining firing opportunities with a step of magnetic flux generation in the rotor by way of firings of the thyristors.

8. The method according to claim 7, which comprises generating the magnetic flux in the rotor by way of two-phase firings of the thyristors at always the same grid phase angle.

9. A soft starter, comprising a firing signal unit and a device configured to carry out the method according to claim 1.

10. A computer program product, comprising computer-readable instructions that cause a soft starter with a firing signal unit and a processor to carry out the method according to claim 1.

11. A non-transitory computer-readable medium containing a computer program product with instructions for a processor of a soft starter to carry out the method steps according to claim 1.

* * * * *